United States Patent [19]

Klees

[11] Patent Number: 5,269,139

[45] Date of Patent: Dec. 14, 1993

[54] JET ENGINE WITH NOISE SUPPRESSING MIXING AND EXHAUST SECTIONS

[75] Inventor: Garry W. Klees, Mercer Island, Wash.

[73] Assignee: The Boeing Company, Seattle, Wash.

[21] Appl. No.: 722,959

[22] Filed: Jun. 28, 1991

[51] Int. Cl.$^5$ .......................... F02K 1/38; F02K 3/02
[52] U.S. Cl. ......................................... 60/262; 60/271
[58] Field of Search ................... 60/204, 226.1, 226.3, 60/261, 262, 271; 181/215, 216, 219, 220

[56] References Cited

U.S. PATENT DOCUMENTS

| | | | |
|---|---|---|---|
| 3,910,375 | 10/1975 | Hache et al. | 181/215 |
| 4,052,847 | 10/1977 | Rodgers et al. | 60/262 |
| 4,422,524 | 12/1983 | Osborn | 181/215 |

OTHER PUBLICATIONS

Thrust Augmenting Ejectors, Part I, by Alperin & Wu at vol. 21, No. 10 of the AIA Journal, Jun. 1982, pp. 1428–1436.
Thrust Augmenting Ejectors, Part II, by Alperin & Wu at vol. 21, No. 12 of the AIA Journal, Jun. 1982, pp. 1698–1706.
NASA Contractor Report 177419 by Dr. Wu prepared for the Ames Research Center in Jul. of 1986, Ames, Iowa, pp.1–28.
Compound-compressible Nozzle Flow by Bernstein, Heiser & Havenor presented at AIAA 2nd Propulsion Joint Specialist Conference at Colorado Springs, Colorado, Jun. 13–17, 1966, pp. 1–71.
SNECMA, M88 Catalog, VMST 634, pp. 1–8, Jun. 1991.

Primary Examiner—Richard A. Bertsch
Assistant Examiner—Howard R. Richman
Attorney, Agent, or Firm—Hughes & Multer

[57] ABSTRACT

The present invention relates to a jet engine, where there is an outer housing, an engine, a mixing section, and an exhaust section. Ambient air is drawn into the mixing section. The gaseous exhaust from the core engine is directed through primary passageway segments in the mixing section, and the ambient air that is drawn into the mixing section means flows into secondary passageway segments in the mixing section. The primary and secondary flow segments passing from the mixing section mix as these pass into the exhaust section to be discharged as mixed supersonic jet flow.

18 Claims, 14 Drawing Sheets

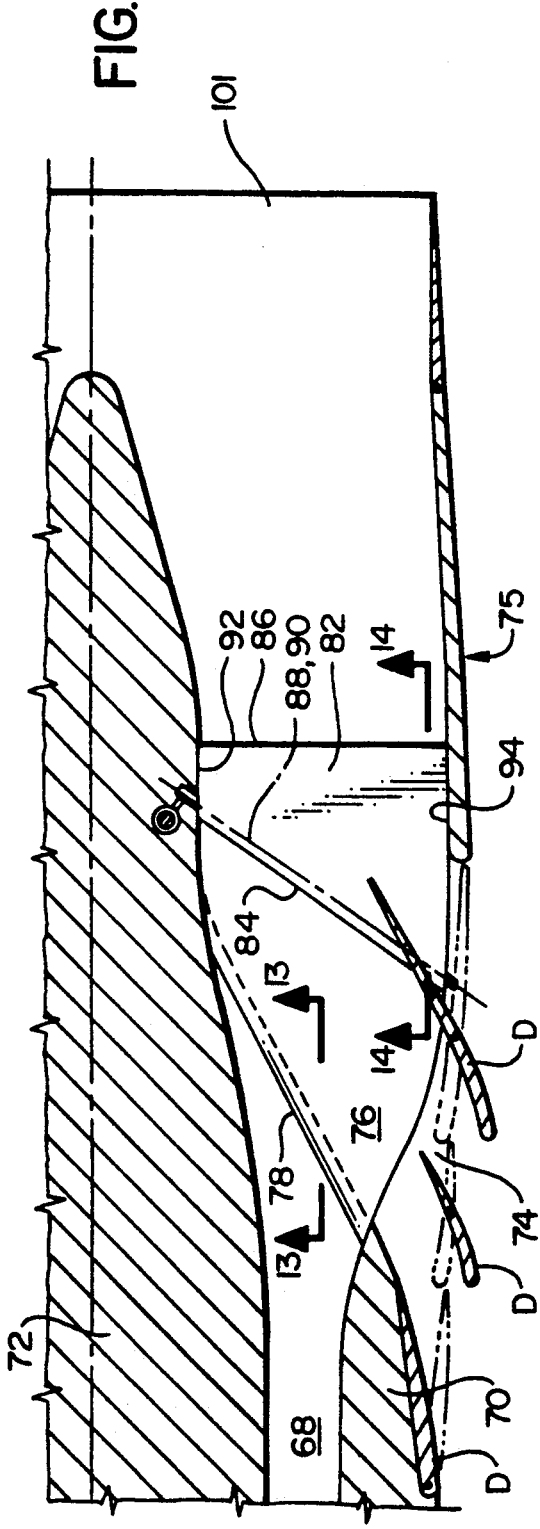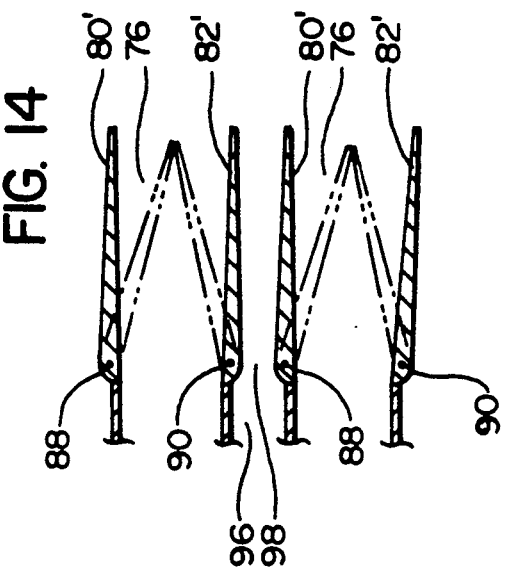

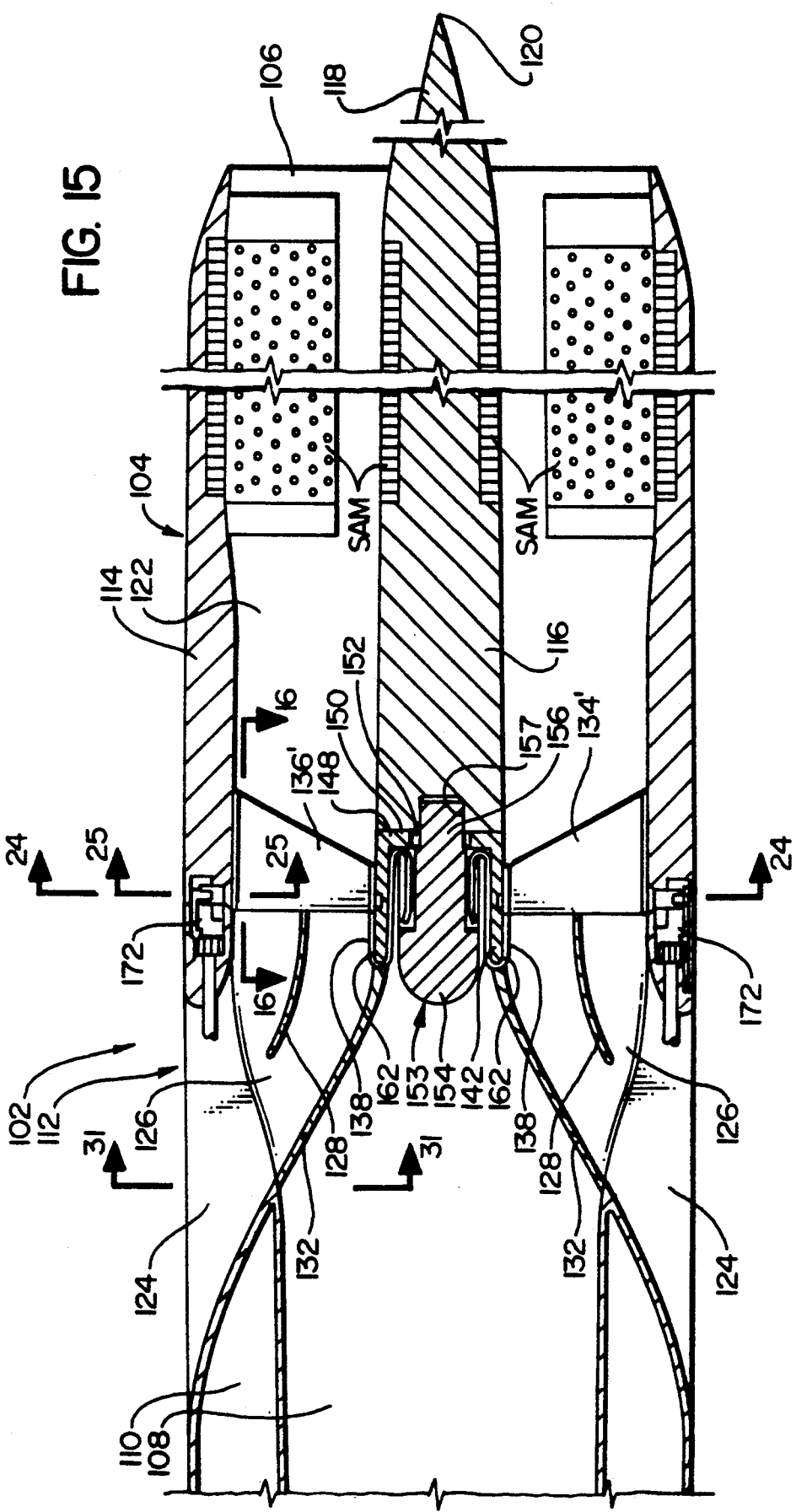

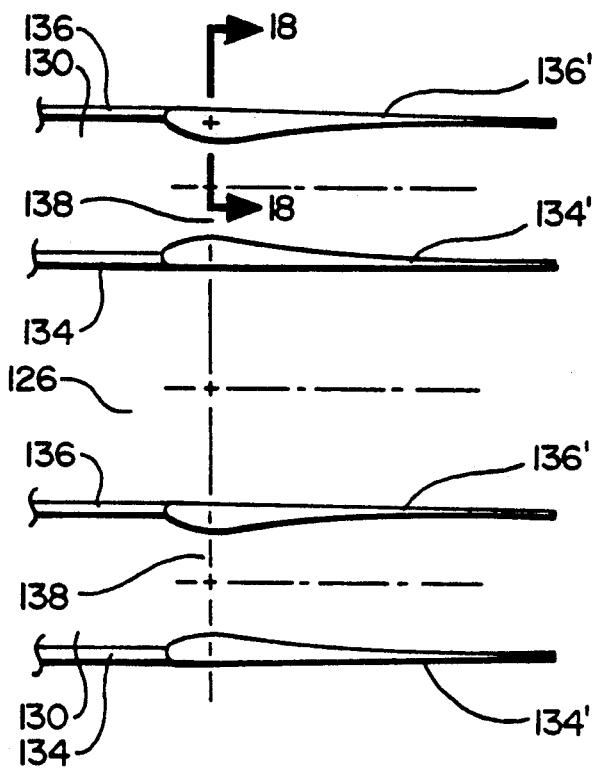
FIG. 16
FIG. 17
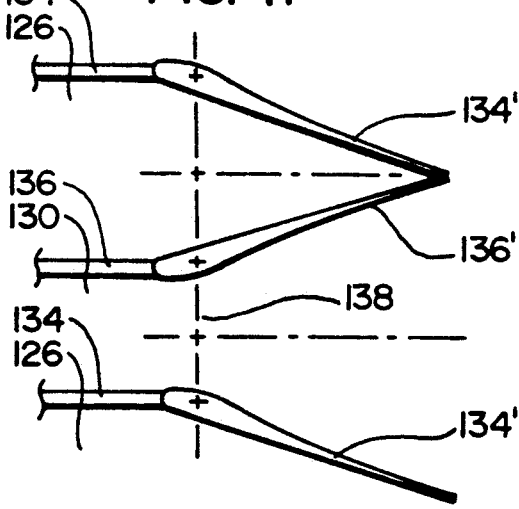
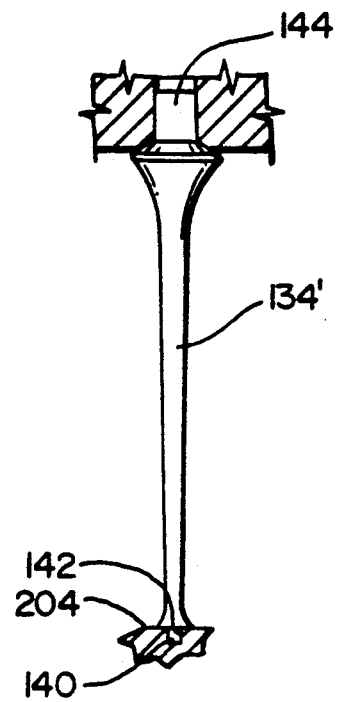
FIG. 18
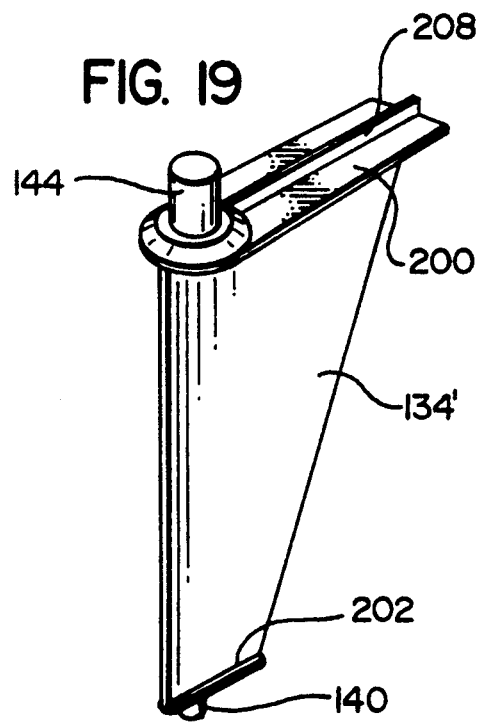
FIG. 19

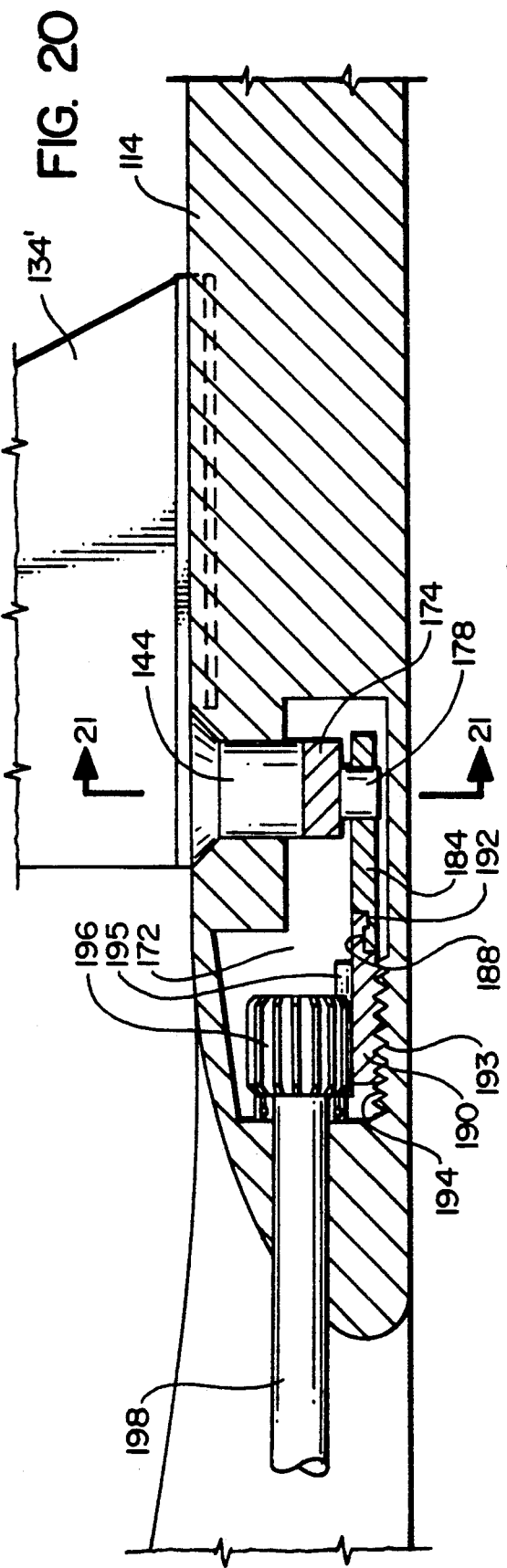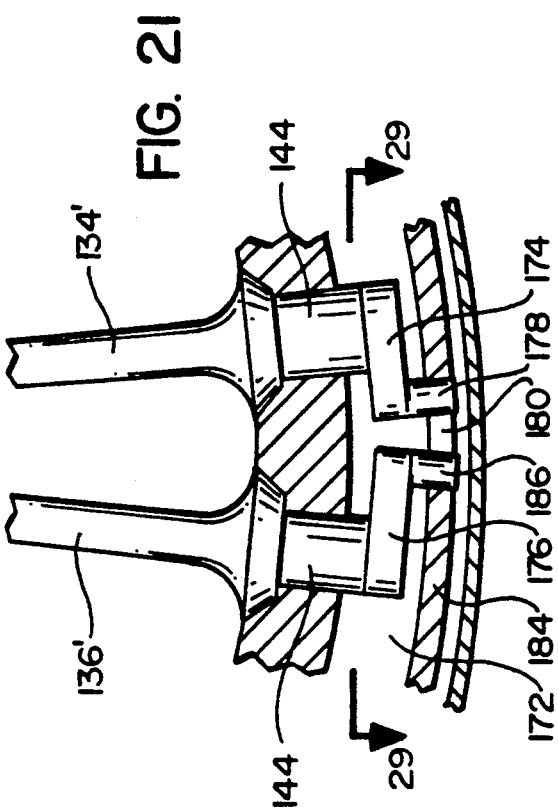

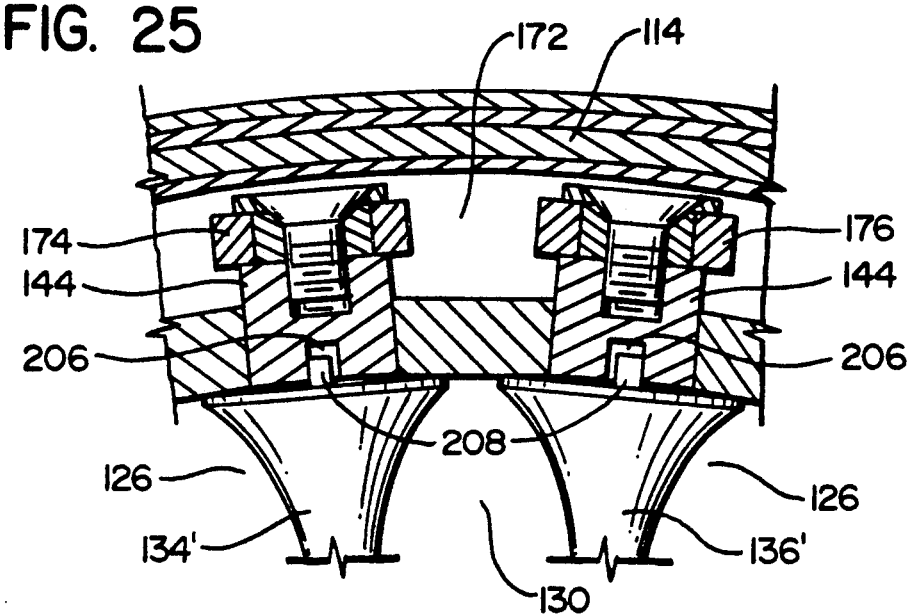
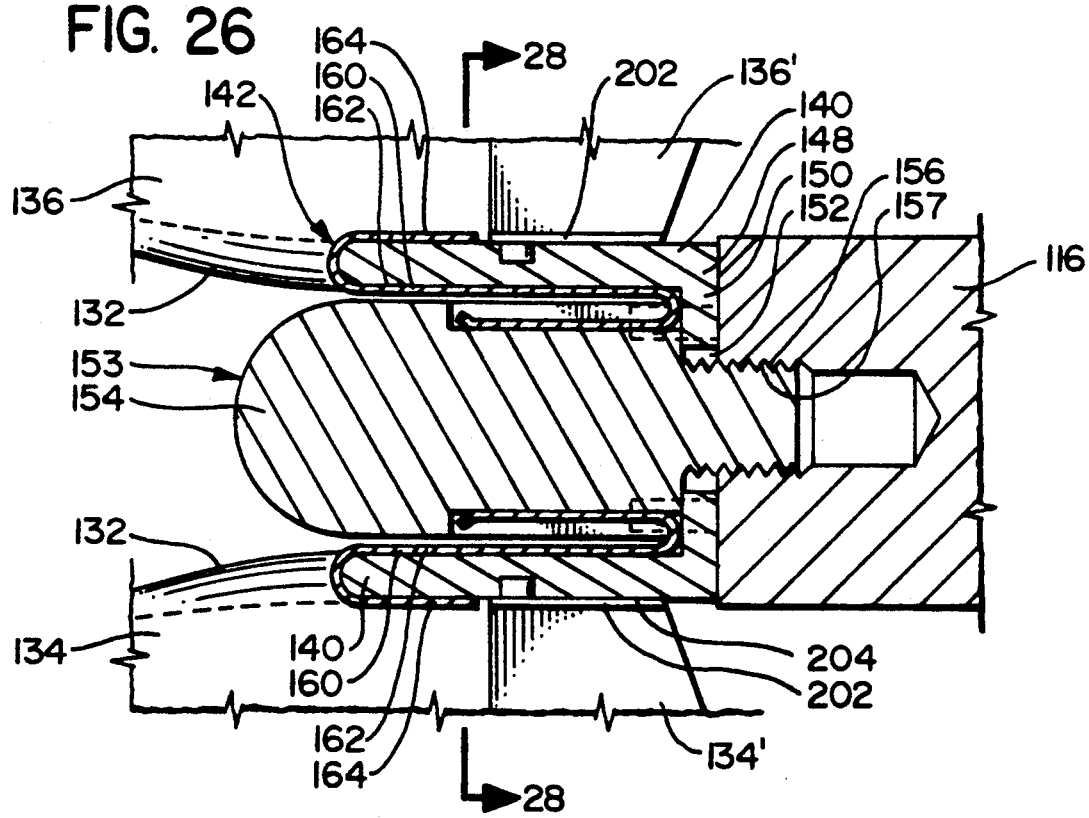

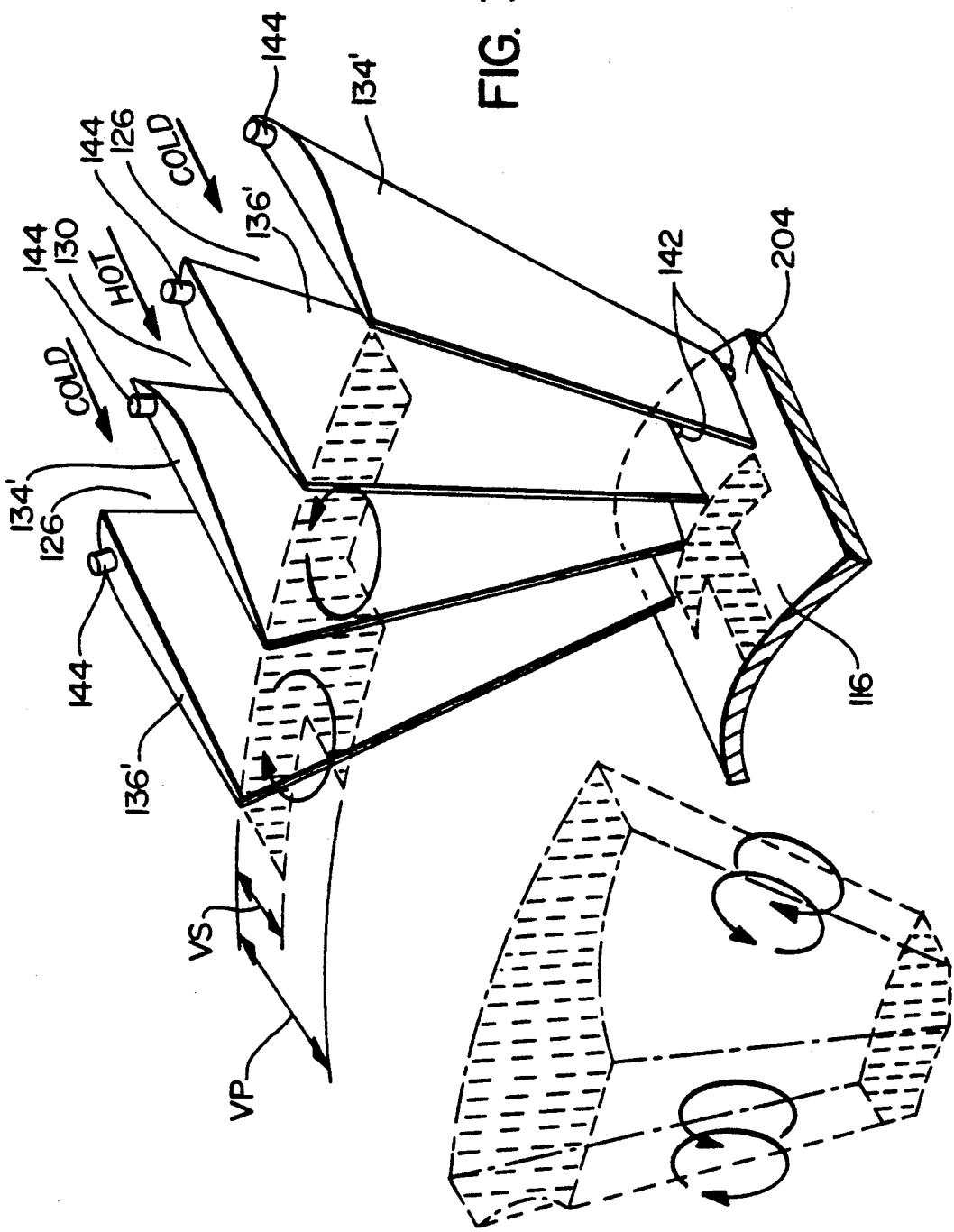

JET ENGINE WITH NOISE SUPPRESSING MIXING AND EXHAUST SECTIONS

FIELD OF THE INVENTION

The present invention relates to a jet engine (in the preferred form a supersonic jet engine) and methods for operating the same, and more particularly to such an engine with noise suppressing mixing and exhaust sections.

BACKGROUND ART

The design of engines that travel at supersonic speeds (e.g. possibly in the range of Mach 2 to Mach 3 at cruise, or possibly higher), involves a number of problems similar to those encountered in the design of sub-sonic jet engines. Thus, there are with both supersonic and sub-sonic engines the general concerns of weight, size, complexity, reliability, cost, etc., and also concerns relative to performance (e.g. thrust, specific fuel consumption, etc.). However, supersonic jet engines pose some special problems. For example, present day optimized designs for supersonic turbojet type engines are characterized in that these have relatively high jet velocities, and also create a high level of noise. Noise suppression in this type of engine is one of the most critical technical problems to be solved in making an environmentally acceptable commercial supersonic jet transport. Another consideration is that a supersonic jet engine must be designed to function adequately through a broad range of operating modes (i.e. take off and climb, acceleration up to supersonic cruise Mach number, as well as being able to cruise at both subsonic and supersonic speeds). Further, the general concerns relating to both subsonic and supersonic engine are exacerbated by the more stringent performance requirements imposed on supersonic jet engines.

With regard to noise suppression, over the last several decades, there have been many different systems proposed and/or used for suppressing noise. One general approach has been to mix the higher velocity jet exhaust with lower velocity air, and there are innumerable patents and other technical disclosures relating to variations on this basic concept. However, quite often these mixing type noise suppressors will degrade performance. This has been particularly true with supersonic engines. One approach to solve this problem has been to deploy the sound suppressing apparatus in its sound suppressing functioning mode during takeoff and climb and other situations where sound suppression apparatus is needed, and then to provide means by which the noise suppressing apparatus could be "stowed" for other operating modes (e.g. supersonic cruise). However, this takes extra space and adds complexities.

The jet engine noise suppressing nozzle disclosed by U.S. Pat. No. 4,501,393, granted Feb. 26, 1985, to Garry W. Klees and Charles P. Wright, and assigned to The Boeing Company, has proven to be an effective noise reducing nozzle for SST type aircraft. This type of nozzle suppresses noise by inducing a secondary flow of ambient air to mix with the engine exhaust gases. This nozzle effectively reduces low frequency noise but does not effectively reduce high frequency noise, i.e., noise above 2 khz. Others have proposed combining with the nozzle a thermal acoustic shield in an effort to reduce the high frequency noise. This approach, however, would add weight to the nozzle and significantly increase its complexity. One principal object of the present invention is to provide a relatively simple noise suppressing nozzle which is lighter and which effectively reduces high frequency noise.

Further, while the trend in subsonic turbo-fan engines has been to build engines with relatively large by-pass ratios so that most of the energy developed by the core engine is actually transmitted into the fan, in supersonic turbojet engines, when a fan is incorporated in the design, the by-pass ratio is generally quite small (e.g. 0.03 to 0.1), and the fan air is often able to provide not too much more than a cooling function. In some instances, it has been proposed to mix the fan air in a supersonic jet engine with the jet exhaust, and this is in some designs incorporated with an after burner. To the best knowledge of the applicant, this mixing would normally occur while both the fan air and the jet exhaust are both subsonic.

In recent years, there have been discussions in the technical literature on ejectors where there is supersonic mixing. For example, in Volume 21, Number 10 of the AIA Journal, there is an article "Thrust Augmenting Ejectors, Part I", written by Morton Elperin and Jiunn-Jeng Wu. A second article appeared in Volume 21, Number 12 of the AIA Journal, bearing the title "Thrust Augmenting Ejectors, Part II", by these same authors. There is an analysis of compressible fluids through a thrust augmenting ejector, and these articles deal with two distinct flows after substantially complete mixing has been accomplished. There is the "first solution", where there is subsonic mixed flow and the "second solution", where there is a supersonic mixed flow. Also there is a later publication which is "NASA Contractor Report 177419", which is authored by Dr. Wu, this being prepared for the Ames Research Center in July, 1986, and both first and second solution ejectors and the tests conducted on these are discussed. Also, there is a publication "Compound-Compressible Nozzle Flow", authored by Arthur Bernstein, William Heiser and Charles Havenor, presented at the AIAA 2nd Propulsion Joint Specialist Conference at Colorado Springs, Colo., Jun. 13-17, 1966, and this deals with the behavior of two or more gas streams flowing through a single nozzle.

SUMMARY OF THE INVENTION

The present invention relates to a jet engine, where there is an outer housing, an engine, a mixing section and an exhaust section. Ambient air is drawn into the mixing section. The gaseous exhaust from the core engine is directed through primary passageway segments in the mixing section, and the ambient air that is drawn into the mixing section means flows into secondary passageway segments in the mixing section. The primary and secondary flow segments passing from the mixing section mix as these pass into the exhaust section to be discharged as mixed supersonic jet flow. Three embodiments are illustrated with supersonic jet engines, and the final embodiment is shown being used with a subsonic jet engine.

The primary passageway segments are arranged so that the gaseous exhaust is emitted from the primary passageway segments at supersonic velocity. The engine is arranged so that the supersonic exhaust emitted from the primary segments mixes with the subsonic air flowing from the secondary passageway segments, with the mixed flow being emitted as a supersonic mixed flow (i.e., in the second solution).

There is a plurality of ambient air inlet passageways arranged circumferentially around the housing and leading radially inwardly and rearwardly to the secondary passageway segments.

In a preferred configuration shown herein, the mixing section is arranged so that the primary and secondary passageway segments are radially extended and alternately interspersed with one another, so as to enhance mixing. More specifically, in the preferred form, these primary and secondary passageway segments are "pie-shaped" (i.e., expanding in width in a radially outward direction). However, within the broader scope of the present invention, other arrangements for the primary and secondary passageway means could be used, such as parallel passageway segments or other configurations. When the engine is operating during certain modes where noise suppression is desired (e.g., take off and initial climb), desirably the engine is operated so that the mixed flow from the engine is subsonic (i.e., in the "first solution"). The mixing of the bypass air with the gaseous exhaust acts to suppress the noise of the engine. In addition, if desired, other noise suppressing devices could be used, such as sound absorbing panels or other noise abatement devices.

In one preferred embodiment, the flow through the primary passageway segments is accomplished by providing fixed converging primary exit portions, with converging diverging plug elements positioned at the primary passageway exit portions.

An alternative embodiment is to provide moveable vanes at the exit end of the primary passageway segments so as to modify the configuration of the throat area of the primary passageway segments. In a specific embodiment shown herein, the primary passageway vanes are pivotally mounted and are radially extending. However, within the broader scope, these could be arranged in other configurations, such as being parallel.

More specifically, in the preferred embodiments of the present invention, there is an annular wall surrounding a tail fairing, with the downstream end of the annular wall forming an outlet for a final nozzle. An annular space is defined within the nozzle by and radially between the annular wall and the tail fairing. The annular wall includes a plurality of air inlets spaced apart circumferentially about the nozzle, well forwardly of the final nozzle outlet. A plurality of air ducts, one for each air inlet, lead inwardly from the air inlets into the annular space. The air ducts have outlet ends positioned within the annular space upstream of the final nozzle outlet. Hot gas passages are formed between the air ducts. The annular space has an upstream portion which in use receives turbine exhaust gases. It also includes an elongated downstream portion which is downstream of the air ducts and the hot gas passages. The turbine exhaust gases flow rearwardly through the hot gas passages and induce ambient air flow into th nozzle through the air ducts. The hot gases and the induced air are mixed within the elongated downstream portion of the annular space.

In the preferred embodiment, the hot gas passages are defined by sidewall surfaces which are configured to give the passages a convergent/divergent shape in the axial direction. Each air duct has a substantially U-shape cross section formed by a closed upstream end and a pair of sidewalls. The outlet ends of the air ducts are defined between the sidewalls at the rear ends of the air ducts.

In accordance with one aspect of the invention, the sidewalls of the air ducts have movable vanes or rear portions. Each rear portion includes a forward end and means mounting said rear portion for sideways pivotal movement about an axis which is located within an axial plane and which is adjacent the forward end of the movable rear portion. In one embodiment, the pivot axes extends substantially radially. In another embodiment the pivot axes slope rearwardly as they extend radially outwardly from the tail fairing to the annular wall.

Also, the present invention is directed toward a method of operation of the jet engine of the present invention.

Other features will become apparent from the following detailed description.

BRIEF DESCRIPTION OF THE DRAWINGS

Like reference numerals are used to designate like parts throughout the several views of the drawings, and:

FIG. 12 is an enlarged scale fragmentary sectional view of a third embodiment of the invention;

FIG. 13 is a fragmentary sectional view taken substantially along line 13—13 of FIG. 12;

FIG. 14 is a fragmentary sectional view taken substantially along line 14—14 of FIG. 12, such view including a solid line showing of the movable rear portions of the duct sidewalls in a fully open position, and including a broken line showing of such movable sidewall portions in a closed position;

FIG. 15 is an axial sectional view of a fourth, preferred embodiment of the invention;

FIG. 16 is a view taken substantially along line 16—16 of FIG. 15;

FIG. 17 is a view like FIG. 16, but showing the movable rear portions of the duct sidewalls repositioned into an air duct closing position;

FIG. 18 is a sectional view taken substantially along line 18—18 of FIG. 16, showing the movable wall section and its trunions in elevation;

FIG. 19 is a pictorial view of the movable rear portion of a duct sidewall, taken from a position above the outer end of such wall portion, and looking toward the front and one side of the wall portion, such view also showing a seal strip in contact with a flange at the outer end of such wall portion;

FIG. 20 is an enlarged scale axial sectional view showing structure at the outer ends of the movable rear portions of the duct sidewalls, for rotating such wall portions in position;

FIG. 21 is a view taken substantially along line 21—21 of FIG. 20, showing drive trunions and drive cranks in elevation;

FIG. 25 is an enlarged scale sectional view taken substantially along line 25—25 of FIG. 15;

FIG. 26 is an enlarged scale, fragmentary, axial sectional view, taken in the hub region of the structure which defines the air ducts and hot gas passages;

FIG. 32 is a pictorial view of the rear portions of the sidewalls which form the air ducts and hot gas passages, such view showing the mixing flow patterns of the hot and cold gas streams, and including velocity diagrams at the radially outer and inner ends of the air ducts and hot gas passages.

DESCRIPTION OF THE PREFERRED EMBODIMENTS

Figure 1:
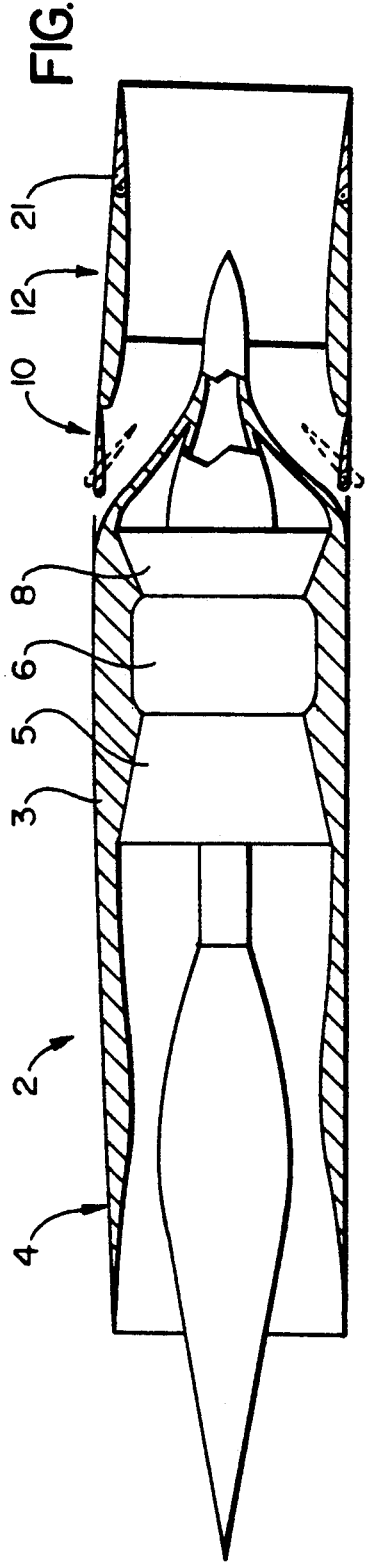
FIG. 1 is a longitudinal sectional view of a supersonic turbo-jet engine of the present invention.

In FIG. 1, there is shown somewhat schematically a supersonic jet engine installation 2 incorporating the teachings of the present invention. This engine 2 comprises an outer annular housing 3, an inlet section 4, a compressor section 5, a burner section 6, a turbine section 8, a mixing section 10, and an exhaust section 12. The inlet, compressor, burner and turbine sections 4-8 comprise an engine that may of itself be of conventional design and which is part of the engine installation 2.

The function and operation of the mixing section 10 in cooperation with other components of the engine installation are significant in the present invention, and the details of this will be described later in this description. This section 10 is designed to obtain what is called the "second solution" (where there is supersonic mixed flow) for engine performance improvement, and also for proper noise abatement where the first solution would normally be used. In general, this mixing section 10 functions to direct the exhaust from the core engine 16 into a plurality of primary passageway segments which are spaced from one another, and also to direct ambient air flow to a plurality of second passageway segments, which are interspersed with the first passageway segments. In the preferred configuration shown herein, the first and second passageway segments go through a transition portion and end at a downstream location in a plurality of "pie shaped" sections, with the primary passageway exits and the secondary passageway exits being spaced in an alternating pattern.

Further, the primary passageway segments are contoured with a converging diverging configuration so that the sub-sonic primary flow entering the primary passageway segments turns supersonic as it exits from its expanding primary passageway segment, this desirably being accomplished with plug elements, as described later herein. Further, in some embodiments the primary passageway segments are arranged so as to vary the geometry of the primary passageway segments to optimize the flow rate by adjusting flow area, relative to the operating mode of the engine at that time, and also to control the flow of the secondary air. The details of this section 10 will be described later herein.

Figure 1A:
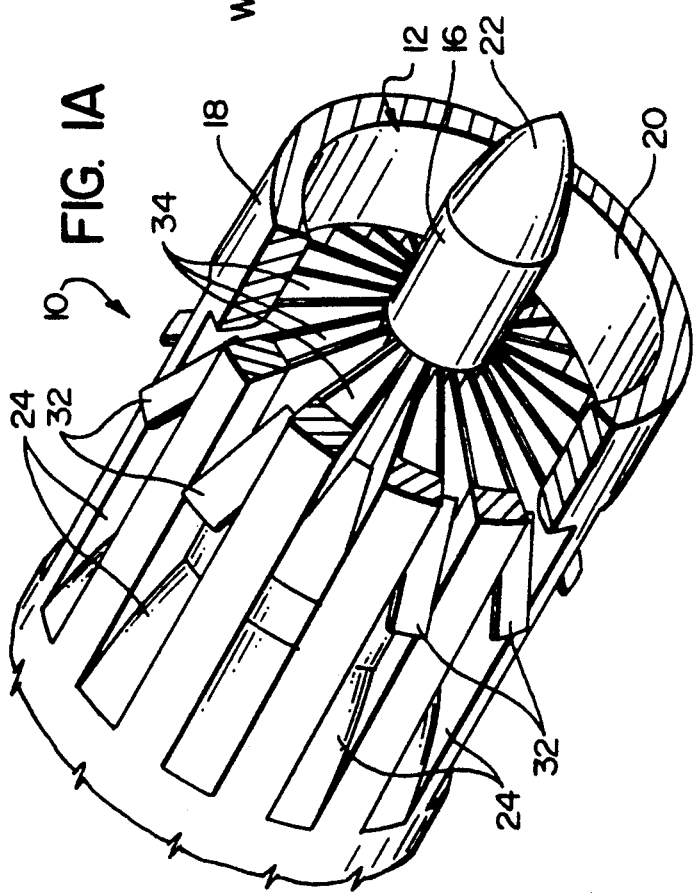
FIG. 1A is a fragmentary pictorial view of the rear section fo gas turbine engine, taken from above and looking towards the rear and one side, with a foreground wall cut away to better illustrate the interior of the engine nozzle.
Figure 3:
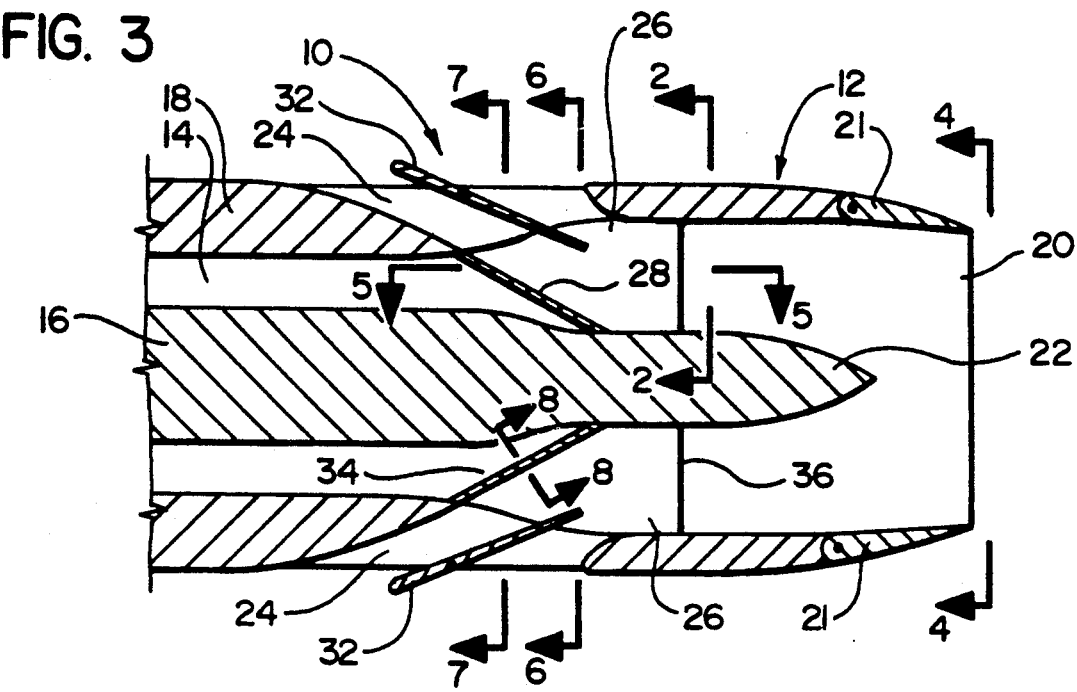
FIG. 3 is an axial sectional view of the turbine section shown by FIG. 1.
Figure 4:
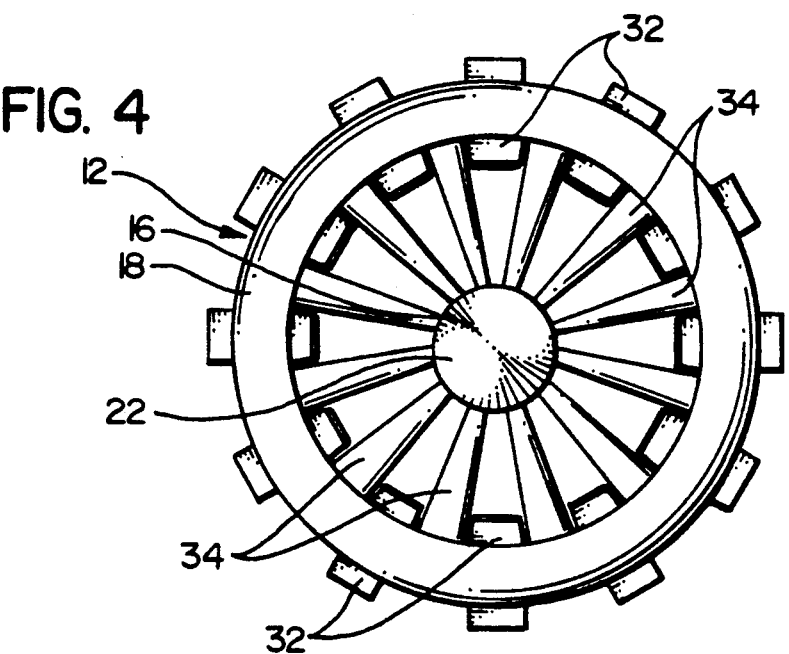
FIG. 4 is an end elevational view of the turbine section of FIGS. 1-3, taken substantially along the aspect of line 4—4 of FIG. 3.

FIGS. 1A and 3 show the mixing section 10 and the exhaust section 12 of the gas turbine aircraft engine 2 in more detail. The hot engine exhaust gases from the turbine section 8 flow through an annular passageway 14 to the exhaust section 12. Passageway 14 is defined by and between a tail fairing 16 and a surrounding annular wall 18 which is part of the engine housing 3. As is well known in the aircraft industry, fairing 16 and wall 18 are hollow structures which house various components of the engine. Annular wall 18 extends rearwardly to the rear of the exhaust section where there is a variable area nozzle 20 made up of a plurality of pivotally mounted flap members 21 that can be moved radially inwardly or outwardly to change the area at the exist plane of the final nozzle 20. Tail fairing 16 extends rearwardly and includes a bullet shape rear end portion 22.

Figure 5:
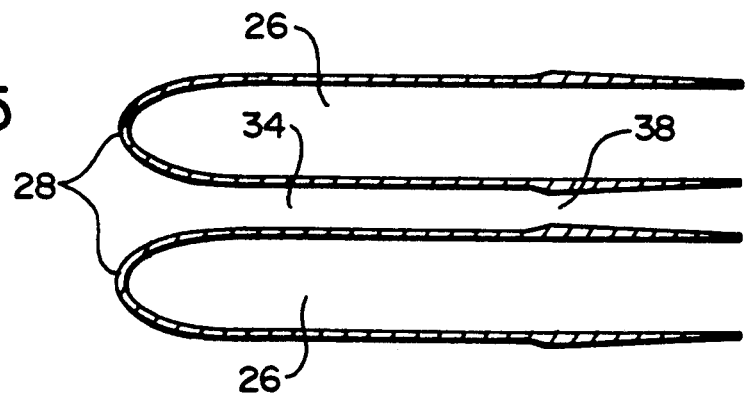
FIG. 5 is an enlarged scale sectional view taken substantially along line 5—5 of FIG. 3.
Figure 6:
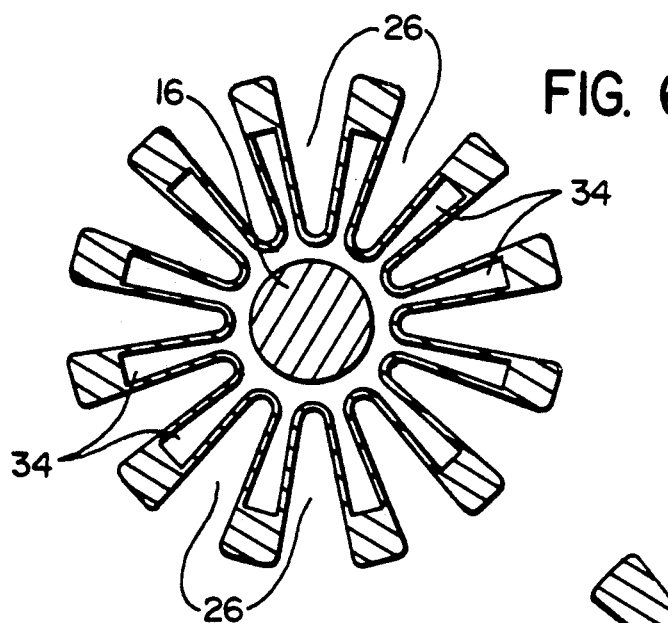
FIG. 6 is a cross-sectional view taken substantially along line 6—6 of FIG. 3.
Figure 7:
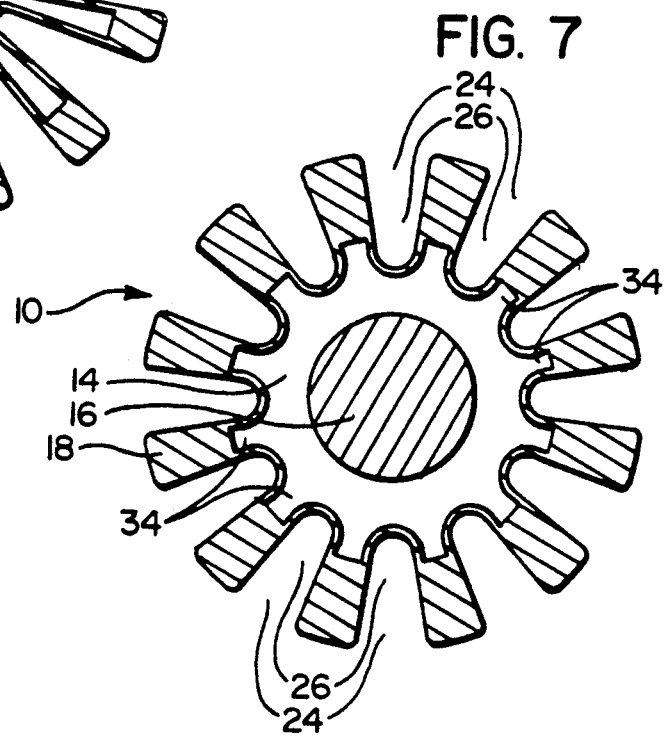
FIG. 7 is a cross-sectional view taken substantially along line 7—7 of FIG. 3.
Figure 8:
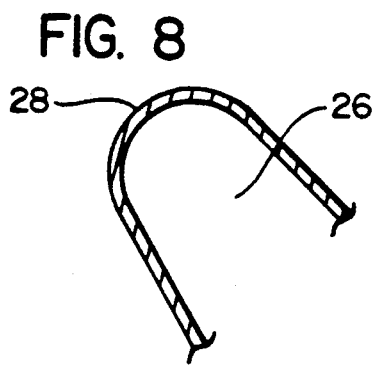
FIG. 8 is an enlarged scale fragmentary sectional view taken substantially along line 8—8 of FIG. 3.

Wall 18 is formed to include a plurality of air inlets 24, spaced circumferentially around the mixing section 10. These air inlets 24 communicate with a like number of air ducts 26. As best shown by FIG. 5, air ducts 26 have a substantially U-shape cross section. They each include a closed forward wall 28 and an open rear end. Inlets 24 may include flow influencing vanes 32. Air ducts 26 are spaced apart circumferentially about the mixing section 10 and hot gas passages 34 are defined between the air ducts 26. The rear or outlet ends of the air ducts 26, and the rear or outlet ends of the hot gas passages 34, terminate at the inside of the exhaust section 12, forwardly of the flap members 21. In the embodiment shown by FIGS. 1-8, these outlets terminate in a common radial plane 36 (FIG. 3). As best shown by FIG. 3, the exhaust section 12 has substantial length between the radial plane 36 and the exit plane of the flaps 21. The hot exhaust gases and induced ambient air mix inside the nozzle 12 in this region between radial plane 36 and nozzle outlet 20, and this function will be disclosed more fully later herein.

As shown by FIG. 5, the sidewalls of the air ducts 26 are configured to define a convergent/divergent section 38 in each hot gas passage 34 so that the engine exhaust becomes supersonic as it passes each of the sections 38. The embodiment of FIGS. 1-8 includes twelve air ducts 26 and twelve hot gas passages 34. However, the number of air ducts and hot gas passages can vary. As few as six air ducts and six hot gas passages have been found to be acceptable.

Figure 2:
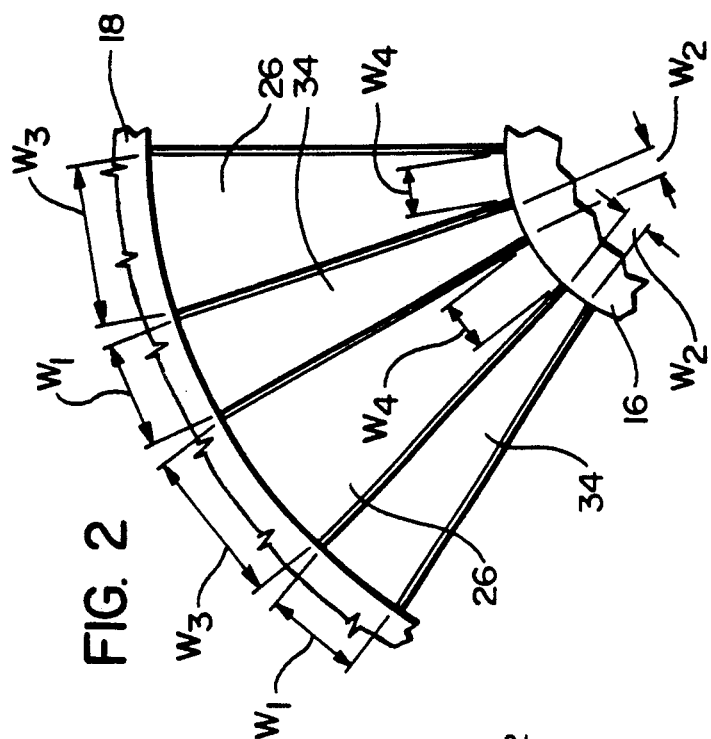
FIG. 2 is an enlarged scale fragmentary sectional view taken substantially along line 2—2 of FIG. 3.
Figure 31:
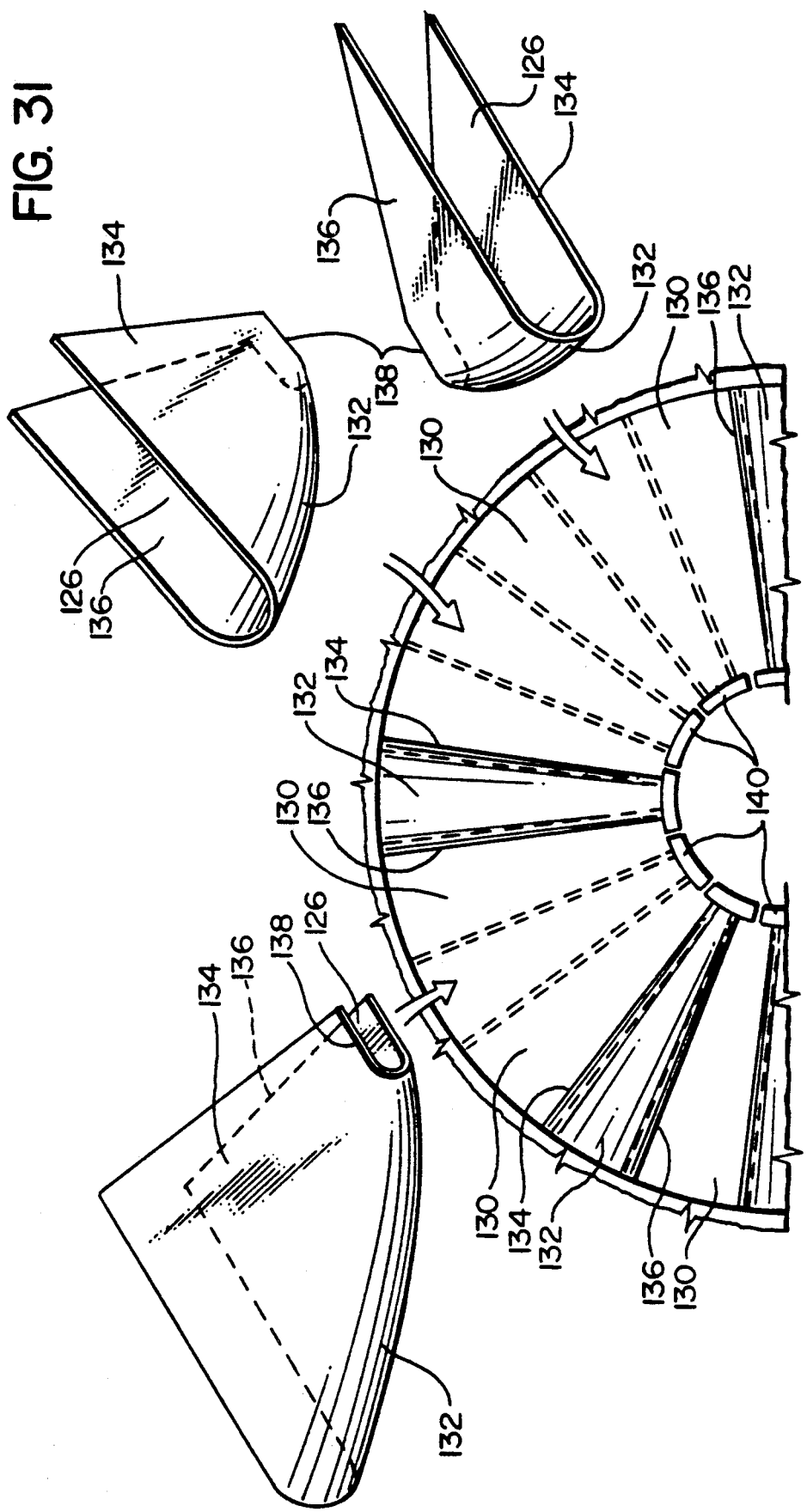
FIG. 31 is an enlarged scale fragmentary sectional view taken substantially along line 31—31 of FIG. 15, with some of the air ducts shown pictorially and spaced and rotated out of position.

As shown by FIG. 2, each hot gas passage 34 has an outer width W1 adjacent wall 18 which is substantially larger than its inner width W2 adjacent the tail fairing 16. In like manner, each air duct 26 has an outer width W3 adjacent wall 18 that is substantially wider than its inner width W4 adjacent tail fairing 16. As will hereinafter be described in connection with FIG. 31, this construction enhances mixing of the hot exhaust gases and induced ambient air.

Figure 9:
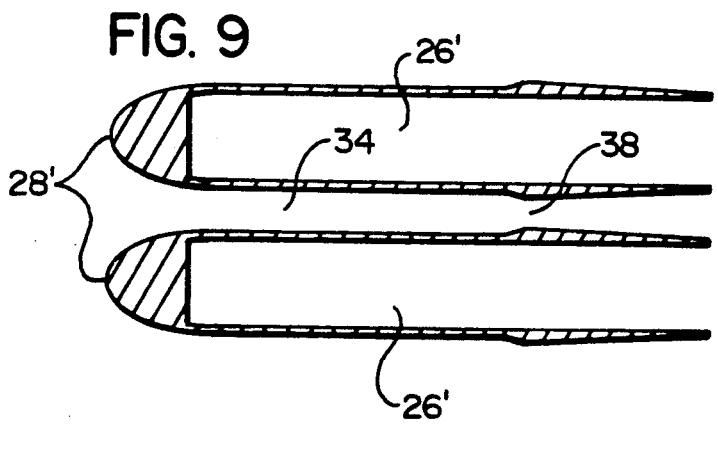
FIG. 9 is a view similar to FIG. 5, showing a modified construction of the forward end portion of the air duct.
Figure 10:
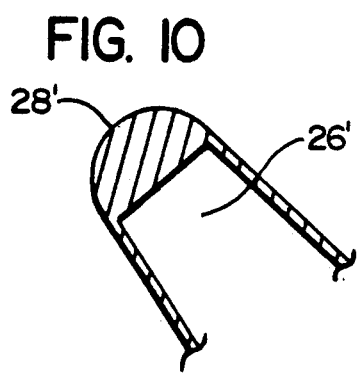
FIG. 10 is a view like FIG. 8, but showing the air duct of FIG. 9.

As shown by FIGS. 9 and 10, the air ducts 26' may be constructed to include reinforced front end portions 28'.

Figure 11:
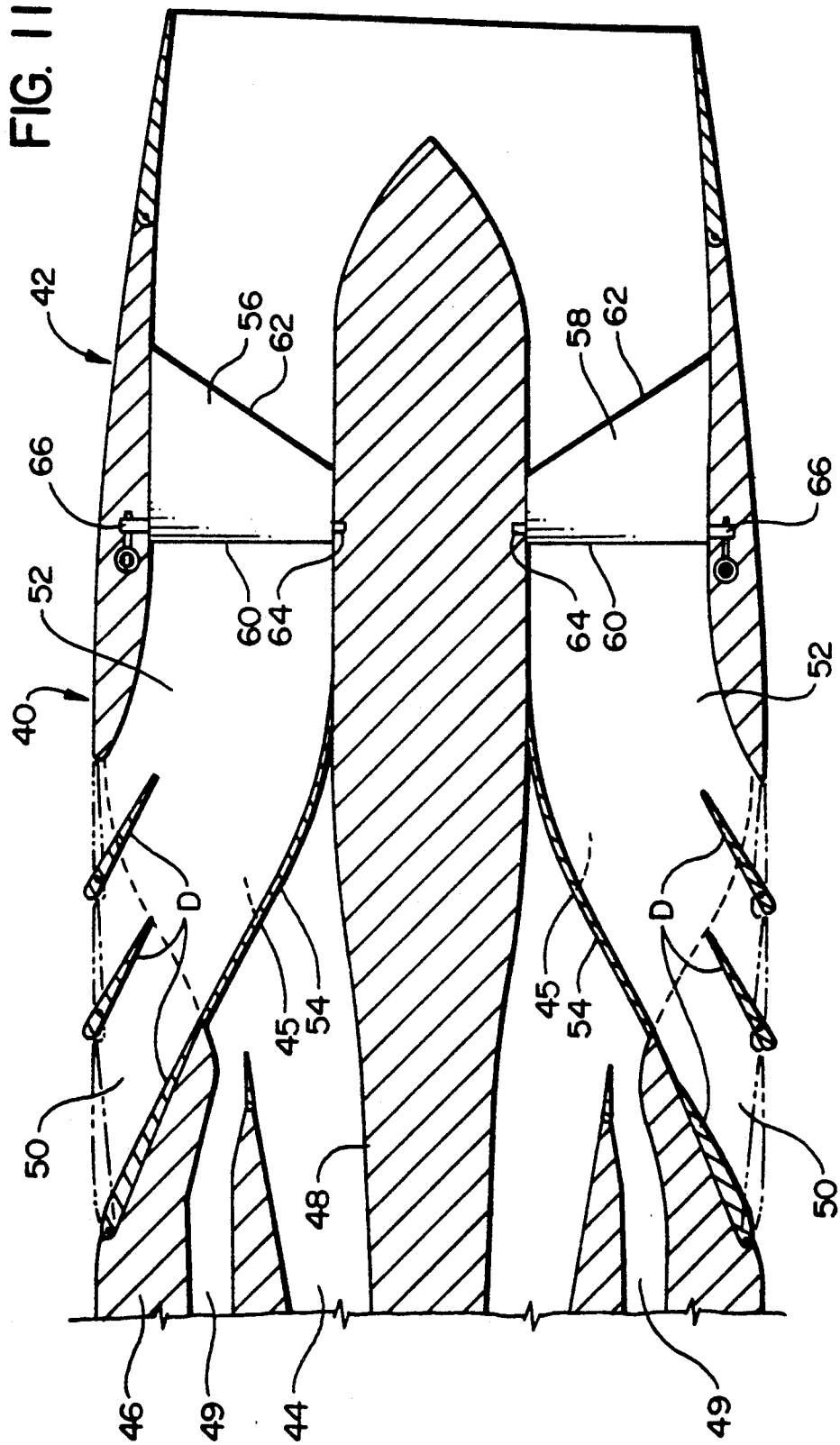
FIG. 11 is an enlarged scale axial section view similar to FIG. 3, but of a modified embodiment of the inventor.

FIG. 11 discloses a modified construction of the mixing section. In this embodiment the mixing section of the engine is designated 40 and the exhaust section is designated 42. As in the first embodiment, an annular exhaust gas passageway 44 is defined by and between an annular outer wall 46 and a tail fairing 48.

The mixing section 40 and exhaust section 42 are arranged to be utilized in a supersonic turbo-fan jet engine, and the fan passageway is illustrated at 49. It is to be understood that the turbo-fan engine could desirably be arranged by mixing the engine exhaust from the passageway 44 with the fan air in the passageway 49 prior to entering into the mixing section 40.

A plurality of ambient air inlets 50 are formed in the sidewall 46. The inlets 50 are spaced apart circumferentially about the engine section 40. Each air inlet 50 communicates with an air duct 52. Hot gas passageways 45 are defined by and between the air ducts 52. In this embodiment, the forward portion of each air duct 52 is fixed. Each air duct 52 includes a closed forward end wall 54 which is essentially like forward end wall 28 in the first embodiment. In the embodiment of FIG. 11, the rear portions of the sidewalls of the air ducts 52 are movable. They are in the form of vanes 56, 58, each having a radially straight forward end 60 and a sloping trailing end 62. The trailing end leans rearwardly as it extends radially outwardly from the tail fairing 48.

In preferred form, a trunion 64 is provided at the radial inner end of each vane 56, 58 adjacent the forward end 60. Trunions 64 fit into bushings carried by the tail fairing 48. Each vane 56 includes a live axle 66 at its outer end, in coaxial arrangement with its trunion 64. The outer ends of the live axles 66 are connected to an adjustment mechanism, in a manner to be hereinafter described in conjunction with the embodiment of FIGS. 15-30. The sides of the vanes 56, 58 which face the air duct are substantially flat. The opposite sides of the vanes 56, 58 are cambered. A pair of such cambered surfaces define for each exhaust gas passage a convergent/divergent section in the axial direction so that the exhaust flow in each exhaust gas passage turns supersonic.

FIGS. 12-14 illustrate a third embodiment of the invention. As in the first two embodiments, an annular hot gas passageway 68 is defined by and between an annular wall 70 and a tail fairing 72. A plurality of air inlets 74 are spaced circumferentially about the nozzle 75. Each air inlet 74 leads into an air duct 76. Each air duct 76 has a substantially U-shaped cross section and a closed forward end 78 which may be thickened, as shown by FIG. 13. Each duct 76 receives air flow in a substantially radial direction and redirects it into a substantially axial direction. The forward ends 78 of the air duct 76 are preferably sloped, in the manner shown by FIG. 12. In this embodiment, the ducts 76 include fixed forward sidewall portions 80, 82 which extend rearwardly from the closed forward portion 78, each to a sloping boundary 84. Each wall 80,82 is associated with a movable rear portion 80', 82' which extends rearwardly from the boundary 84. The movable portions 80', 82' of the walls include rear edges which may all be situated in a common radial plane 86 (FIG. 12). The movable rear portions 80', 82', of the walls are mounted for pivotal movement about axes 88, 90. In this embodiment, the axes are sloped in the manner shown by FIG. 12. In this embodiment the surface regions 92, 94 at the radial inner ends of the movable portions 80', 82' must be conical surfaces of revolution, developed from the axes 88, 90.

In this embodiment, as in the embodiments of FIGS. 1-11, hot gas passages 96 are defined between each adjacent pair of the air ducts 76. The surfaces of the sidewall portions 80', 82' which form rear boundaries for the air ducts 76 are preferably flat. The opposite surfaces which form the rear boundaries for the hot gas passageways 96 are cambered in the manner illustrated in FIG. 14 so as to provide a convergent/divergent section 98. As in the earlier embodiments, the air inlets 74 may be provided with closure doors. FIGS. 11 and 12 include solid line showings of the closure doors D in an open position, and phantom line showings of the doors D in a closed position.

As in the earlier embodiments, hot gases flowing axially rearwardly through the hot gas passageway 68 flows axially into and through the hot gas passageways 98 to become supersonic. In the region of the air ducts 76 the annular space 68 increases in its radial dimension. The hot gases flowing through the passages 98 inject into the gas stream air from the region immediately surrounding the inlets 24, 50 or 74. The supersonic exhaust flow from the convergent/divergent sections 38,98 function like jet pumps. Thus, they pump or eject air through the air ducts 26,52,76. The air flowing through the air passages 26,52,76 assumes an axial flow direction while in the air ducts 26 52,76. The air flowing out from the outlets of the air ducts 26,52 76 flows in substantially parallel axial paths with the hot gases flowing through the hot gas passages 34,96 and begin to mix. As will hereinafter be explained, velocity differences cause swirling flow patterns which enhance mixing of the hot gases and cold air in exhaust section upstream of the final nozzle outlet 101.

Additional features of the invention will now be described with respect to the embodiment shown by FIGS. 15-32. In this embodiment, the mixing section of the engine is designated 102, and the exhaust section is designated 104. The final nozzle outlet is designated 106. As in the earlier embodiments, a hot gas passageway 108 is defined by an annular wall 110. In this embodiment the passageway 108 is circular in cross section. Hot gases flowing rearwardly through it are in effect funnelled into the mixing structure 112. Annular walls 110 and 114 may be considered to be sections of a single annular wall.

The embodiment shown in FIGS. 15-32 is arranged to be used in a subsonic jet engine. However, it is to be understood that various features of this embodiment of FIGS. 15-32 could also be utilized in the other embodiments described in this patent application, as well as be used in conjunction with the teachings of the various other patent applications cross-referenced herein.

In this embodiment, an annular wall 114 is disposed rearwardly of the mixing structure 112. Annular walls 110 and 114 may be considered to be sections of a single annular wall. In the exhaust section 104, there is a tail fairing 116 which is centrally located within the exhaust section 104. Annular wall 114 concentrically surrounds tail fairing 116. Tail fairing 116 may commence at the mixing structure 112 and extends axially rearwardly therefrom and out through the final nozzle outlet 106. The rear portions of the tail fairing 116 is bullet shaped at 118 and substantially comes to a point 120. An annular mixed gas passageway 122 is defined by and between the annular wall 114 and the tail fairing 116.

Annular wall portion 110 includes a plurality of air inlets spaced circumferentially about the engine section 102. These air inlets 124 communicate with air ducts 126 which extend from the inlets 124, first radially inwardly and then axially, to duct outlets which are directed substantially axially rearwardly. As shown by FIG. 15, curved flow directing vanes 128 may be provided within the forward portions of the air ducts 126, to help redirect the flow direction of the air streams. Vanes 128 may also structurally brace the air ducts 126. Thus, as in the earlier embodiments, the air flow is generally radially into the air ducts 126 and generally axially outwardly from the air ducts 126, parallel to the centerline axis of the engine. As in the earlier embodiments, hot gas passages 130 are formed circumferentially between the air ducts 126 and radially between annular wall sections 110, 114 and tail fairing 116.

In the embodiment of FIGS. 15-30, the air ducts 126 have forward portions which are fixed. These forward portions have a generally U-shaped cross-sectional shape. They have forward ends 132 which are closed and sidewall parts 134, 136 which extend rearwardly from the forward portion 132. The radial outer ends of the air duct portions 132, 134, 136 are fixed to the engine wall are fixed to the engine wall 110 in the regions surrounding the air inlets 124. The radial inner ends 138 of duct portions 132, 134, 136 are each connected to a separate section 140 of a hub ring 142. As shown by FIGS. 15 and 16, the sidewall portions 134, 136 of air ducts 126 are also sidewall portions of the hot gas passages 130. Each wall portion 136 includes a rearward extension 136' which is movable. In like manner, each sidewall portion 134 includes a rear extension 134' which is movable. Wall portions 134', 136' are hereinafter sometimes referred to as vanes. As in earlier embodiments, the wall portions 134', 136', each have a flat air duct side and a cambered side hot gas passage side. The cambered regions of the wall portions 134', 136' define convergent/divergent regions 138 in the hot gas passages 130 (FIG. 16).

Each wall portion or vane 134', 136' includes a trunion or passive axle 144 at its radial inner end which fits into a bushing 142 carried by a hub ring section 140. Each wall section or vane 134', 136' includes at its outer end a live axle 144 which is connected to a drive mechanism which functions to rotate the vanes 134', 136'. As shown by FIG. 16, the vanes 134', 136', may be set into axial alignment with the fixed wall portions 134, 136. This provides a fully open air passage through the air ducts 136. In operation, hot gases flowing rearwardly from hot gas passageway 108 are funnelled by the duct structure 132, 134, 136 into the hot gas passages 130. As the hot gases flow through the passageway 130 they eject or pump air through the inlets 124 and the air ducts 126. The hot gas and induced air streams flow substantially axially into the passageway 122, as parallel axial streams. Mixing starts at the forward end of passageway 122 and continues as the hot gases and air flow rearwardly through the passageway 122.

The rear wall portions or vanes 134',136' are adjustable in position for the purpose of controlling the amount of air flow through the air ducts 126 and also the flow exhaust passages. As shown by FIGS. 16 and 17, the vanes 134',136' are swingable into the air ducts 126. FIG. 17 shows two vanes 134', 136' moved completely together. In the embodiment of FIGS. 15-30, this represents about a twenty degree swing of each vane 134', 136'. In the preferred mode of operation, the vanes 134', 136' will be moved to only partially close the air ducts 126.

The embodiment of FIGS. 15-31 preferably includes a sound absorbing material SAM in the annular passageway 122, between the mixing structure 112 and the final nozzle outlet 106. The use of the sound absorbing material SAM forms the subject matter of my co-pending application, filed substantially concurrently with this application, which is entitled "Noise Suppressing Nozzle for Jet Engines".

Figure 22:
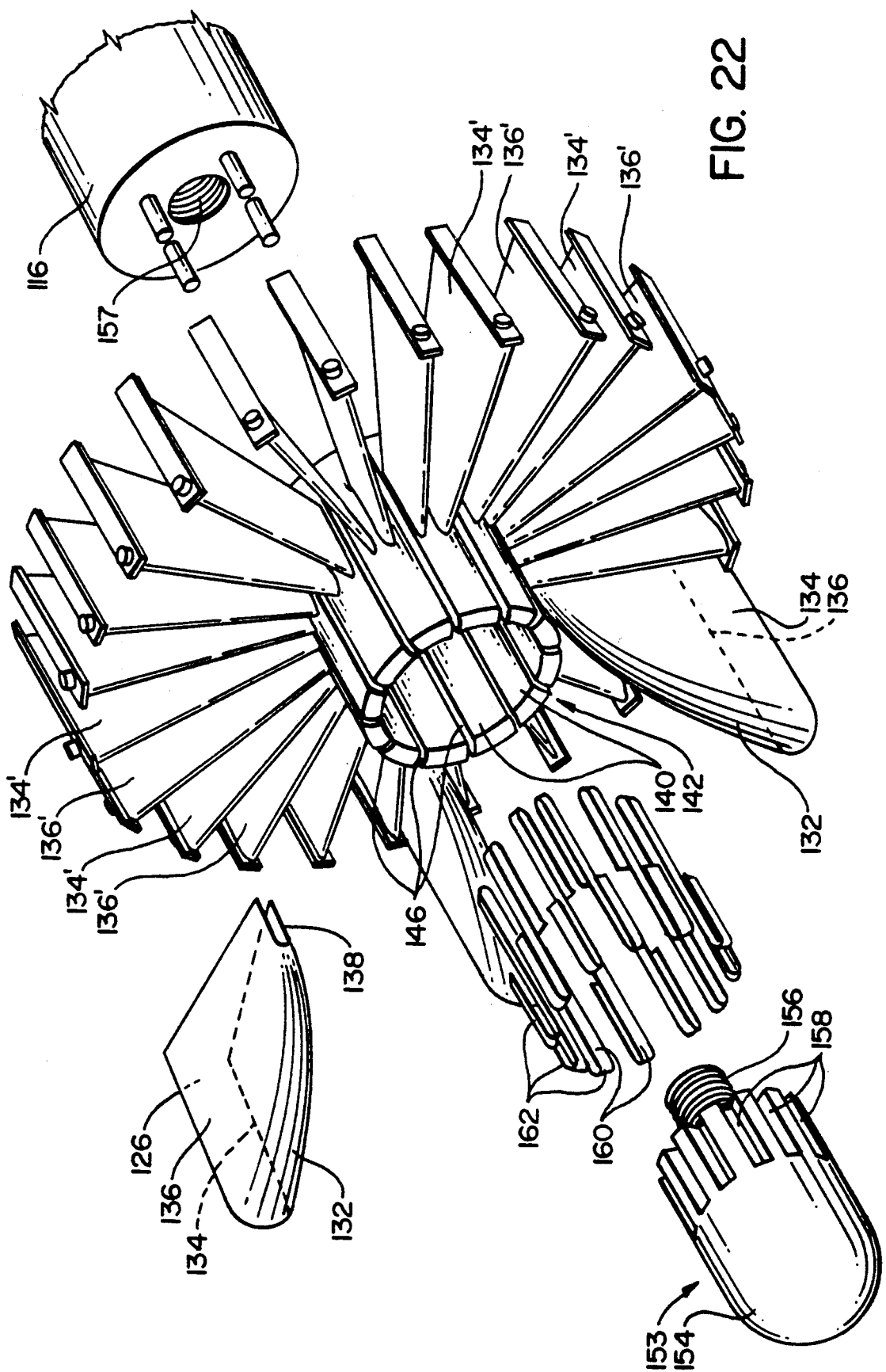
FIG. 22 is an exploded pictorial view of the hub region of the air ducts and hot gas passages, such view including a fragmentary showing of fixed forward portions of the walls which define the air ducts and the hot gas passages.
Figure 23:
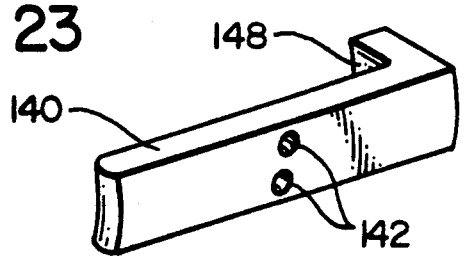
FIG. 23 is an enlarged scale pictorial views of a hub ring segment.
Figure 24:
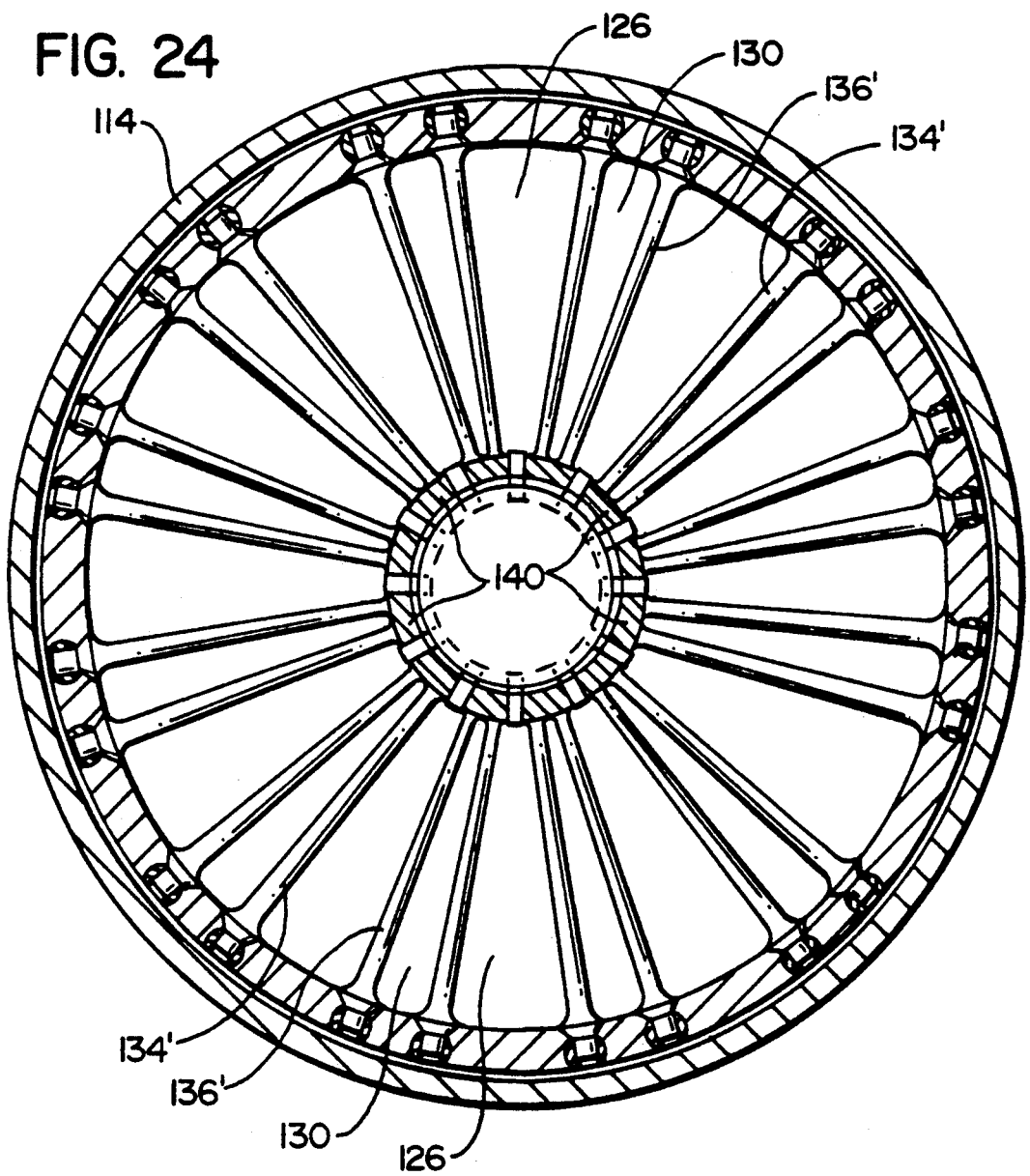
FIG. 24 is an enlarged scale fragmentary cross-sectional view taken substantially along line 24—24 of FIG. 15.

The forward portions 132, 134, 136 of the air ducts 126 are in the nature of support spokes. As previously stated, the radial outer end of each of these structures 132, 134, 136 are rigidly connected to the engine wall 110. A separate hub section or segment 140 is rigidly secured to the radial end of each such structure 132, 134, 136. As shown by FIGS. 15, 22, and 24, the air duct portions 132, 134, 136 functioning like spokes, position the hub sections 140 into a ring like pattern. Together the sections 140 form a hub 142 that is annular in shape but divided by axial splits 146. This allows some movement of the hub sections 140 relative to each other. However, as will be appreciated, the amount of movement permitted is very limited.

Figure 28:
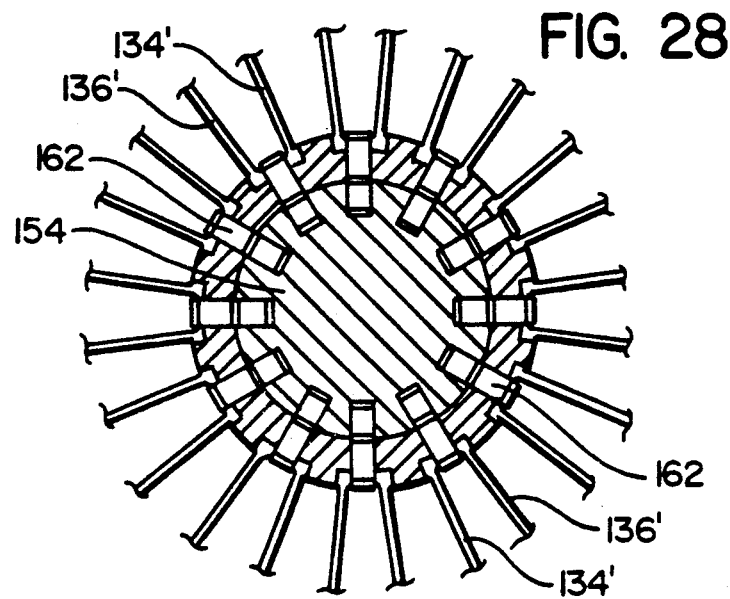
FIG. 28 is a sectional view taken substantially along lines 28—28 of FIG. 26.
Figure 27:
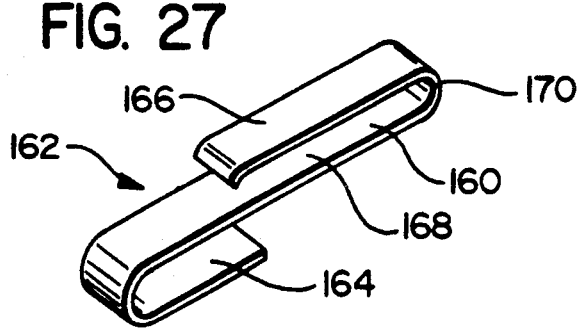
FIG. 27 is an enlarged scale pictorial view of a leaf spring and seal.

Each hub section 140 includes a short radial wall 148 at its rear end. Collectively, the wall portions 148 of the hub sections 140 define a radial wall 150 having a substantially circular center opening 152 (FIG. 15). The tail fairing 116 is connected to the hub 142, by means of a bolt 153 having a large head portion 154 and a threaded shank portion 156. The forward end of head 154 may be semi-spherical in shape, or at least be rounded. Head 154 is preferably formed to include a plurality of axial recesses 158 spaced circumferentially about its periphery. Each recess 158 is constructed to receive a main body portion 160 of a leaf spring 162. Each leaf spring 162 includes a forward hook portion 164. As shown by FIGS. 15, 22, 26 and 28, the main body portions 160 of the leaf spring members 162 are inserted into the cavities 158, and then the bolt 153 is inserted threaded end first into the hub ring 142. The connector bolt 153 is moved rearwardly until the rear boundary of the head 154 is against the forward boundary of the radial wall 150, the threaded shank 156 is extending rearwardly through the opening 152, and the hook portions 164 of the leaf spring members 162 are hooked onto forward portions of the hub 142. As shown by FIG. 28, each hook portion 164 covers the forward part of a separate split 146. The fit of the hooks 164 onto the split regions of the hub ring 142 is relatively snug fit, so the hook portions 164 can function as seals. They function to seal against the flow of hot gases from passageway, 108 through the splits 146. As shown by FIG. 27, the main body portion 160 is formed by a pair of spaced apart arms 166, 168 connected at their rear ends by a bight 170. The hub sections 140 are supported radially by the main body portions 160 of the leaf springs 162. When the connector bolt and spring assembly is inserted into the hub ring 142, the spring arms 166 are moved towards the opposing spring arms 166. This stores spring energy in the springs 162, causing them to normally exert a radially outwardly directed force on the radial inner ends of the movable vanes 134', 136'. The vanes 134', 136' and the supporting structure for the vanes 134', 136' will expand and contract during engine operation. The springs 162 will permit the movement that wants to occur in the radial direction. The splits 146 will permit some expansion and contraction movement in the circumferential direction. After connector bolt 153 is positioned within hub ring 142, the tail fairing 116 is inserted into the nozzle. A threaded axial sprocket 157 at the forward end of tail fairing 116 is mated with the threaded shank 156. Then the tail fairing 116 is rotated to the extent necessary to make a tight connection of threaded shank 156 with threaded socket 157.

Figure 29:
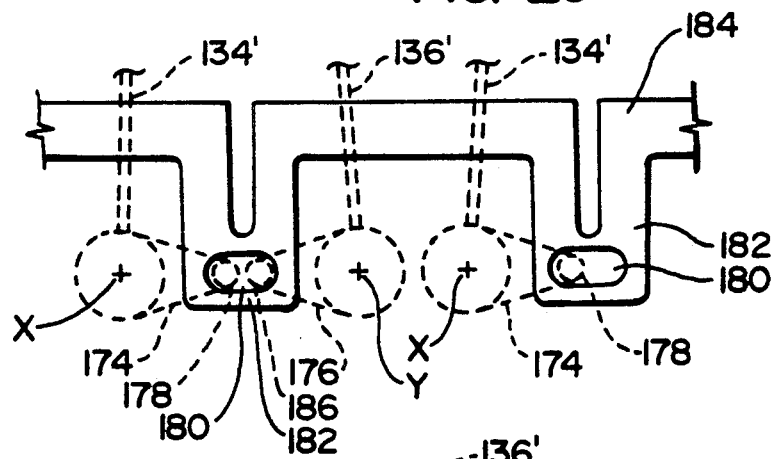
FIG. 29 is a view taken substantially along line 29—29 of FIG. 21, with some parts of phantom line, such view showing the drive mechanism for the movable rear wall portions of the ducts, in a first position of adjustment.
Figure 30:
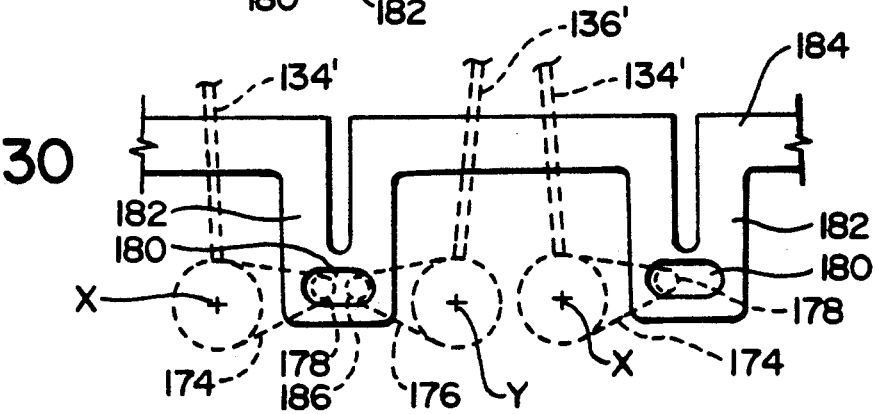
FIG. 30 is a view like FIG. 29, but showing the drive mechanism moved to reposition the movable rear portions of the duct walls.

A mechanism for rotating the vanes 134',136' will now be described, with reference to FIGS. 20, 21, 29 and 30, in particular. Referring to FIGS. 20 and 21, a wall 114 is shown to include a cavity 172 radially outwardly of the live axles 144. Within cavity 170, a radial arm 174 is connected to the outer end of each live axle 144 for vanes 134'. A similar radial arm 176 is connected to the outer end of each live axle 144 for vanes 136'. Each arm 174, 176 extends radially outwardly from its live axle 144. The outer end of arm 174 includes a pin 178 which fits into a slot opening 180 formed in an axial extension 182 of a ring 184. The outer end of radial arm 176 carries a like pin 186 which fits within the same slot 180. Ring 184 includes a circumferential lip 188 which fits into a complementary circumferential slot in a second ring 190. Ring 190 includes a similar lip 192 which fits in a complementary slot within ring 184. As shown in FIG. 20, lip 188 is directed radially inwardly. Lip 192 is directed radially outwardly. The interengaging lips and slots connect the rings 184, 190 together for movement in the axial direction but allows ring 190 to rotate relative to ring 184. The engagement of the pins 178, 186 in the slots 180 prevents rotation of ring 184. Ring 190 includes external threads 193 which mate with internal threads 194 on the radial outer wall of the cavity 172. The forward end portion of ring 190 includes radially inwardly directed gear teeth 195. A spur gear 196 is located within cavity 172. It includes teeth which are in engagement with the teeth 195. Spur gear 196 is mounted onto the end of a rotatable shaft 198. As will be radially apparent, rotation of shaft 198 in a first direction will cause gear 196 to rotate ring 190 in a first direction. A reverse rotation of shaft 198 will cause gear 196 to rotate ring 190 in the opposite direction. Any suitable motor can be used for rotating shaft 198. Rotation of ring 190 causes ring 190 to also move in the axial direction, towards the front or rear of the engine. The axial movement is transmitted by the connection at 188, 192, but the rotation movement is not transmitted. Thus, rotation of shaft 198 in a first direction will cause a rearward movement of ring 184. The reverse rotation of shaft 198 will cause a forward movement of the ring 184. As shown by FIGS. 29 and 30, axial movement of the ring 184 will move the position of slot 180 relative to the rotational exes X and Y of the vanes 134', 136'. The movement of the slot 180 causes an axial movement of the pins 178, 186 and the axial movement of the pins rotates the arms 174, 176 in position. This in turn rotates the live axles 144 and hence in position. This in turn rotates the live axles 144 and hence rotates the vanes 134', 136'. The purpose of FIGS. 29 and 30 is to show how the axial movement of the ring 184 will cause a rotational movement of the vanes 134', 136'. It is not the intent of FIGS. 29 and 30 to show any desirable position of the vanes 134', 136'. As previously described in connection with FIGS. 16 and 17, vanes 134', 136' are in the preferred embodiment moved between parallel positions and positions in which they move together in the air ducts 126.

Referring now to FIG. 19, which shows a vane 134', by way of example. The vanes 136' are of like construction but with the flat and cambered sides reversed. Each vane 134 ', 136 ' includes a large end flange 200 at its radially outer end and a smaller end flange 202 at its radially inner end. As shown by FIG. 26, flanges 202 contact surfaces 204 on the hub sections 140. As shown by FIG. 25, the outer end flanges 200 are directed towards axial slots 206 formed in wall 114. A seal member 208 is provided for each one 134', 136'. A seal member 208 is shown in FIG. 19, in the position it occupies relative to flange 200 when vane 134' extends substantially axially. Flange 200 is wide enough to remain in contact with the seal member 208 throughout the range of swing movement of the vane. In FIG. 25 the seal members 208 are shown positioned within the seal ring slots 206. This figure also shows that the seal ring slots 206 are both wider and deeper than the seal members 208. Depending on the specifics in the design, the pressure in the hot gas passages 130 is expected to be larger than the pressure in the air ducts 126, and there will thus be some leakage of pressure between wall 114 and the flanges 200. This pressure will enter into each seal cavity 206 and push the seal member 208 sideways, into sealing contact with a side surface of the cavity 206. The pressure will also become exerted radially between the base of the cavity 206 and the confronting surface of the seal member 208. This will exert a force on the seal member 208, urging it towards the outer surface of flange 200. In this manner, the seal member 208 will effectively seal against pressure transfer adjacent the annular wall 114, from the hot gas passages 130 into the air ducts 126. A leaf spring may be positioned in each seal cavity 206, between the base of the cavity and the seal member 208, for biasing the seal member 208 radially inwardly.

Referring to FIG. 32, the movable portions 134', 136' of the common sidewalls of the air ducts 126 and the hot gas passages 130 are shown to be positioned with their flat side substantially and extending axially of the passageway 122 (see FIG. 15). The velocities adjacent wall 114 and the velocities adjacent tail fairing 116 are both shown, for comparison purpose. As shown, the hot gas velocity $V_p$ is greater than the cold air velocity $V_s$. There is a faster mixing of the hot and cold gases in the region adjacent the fairing 116 than there is in the region adjacent the annular outer wall 114. This is because the air ducts and the hot gas passages are narrower adjacent the fairing than they are adjacent the annular wall 46. The faster mixing adjacent fairing 116 creates a radial velocity gradient in the hot flow, in a first direction, and another radial velocity gradient in the cold flow, in the opposite direction. The opposing gradients enhance radial mixing and amplifies the normal mixing velocity.

The rear portions 134', 136' of the common walls of the air ducts and hot gas passages are made to be movable for controlling the amount of air flow through the air ducts 126, and also the vary the geometry of the exhaust passages 130. Wall portions 134', 136' may be swung relatively together, for reducing the exit area of the air ducts 126. Wall section 134', 136' may be given the capability of being swung together into a contacting position.

The illustrated embodiment is presented by way of example. In other embodiments, the passageway from the turbine may have a different configuration. Also, the inlets 24 (see FIG. 1A) may communicate with a surrounding duct having its own inlet. The scope of protection is not to be limited by the embodiments which have been illustrated and described. Rather, it is to be determined by an interpretation of the claims which follow, in accordance with established rules of patent claim interpresentation, including use of the doctrine of equivalents.

To describe the operation of the first embodiment of the present invention, the ambient air intake ducts (24 in the first embodiment) have their respective flow influencing vanes 32 full open at take-off for maximum noise jet suppression, thus permitting ambient air to be driven by the ejector action created by the primary flow, with the engine exhaust and ambient air mixing in the exhaust section 12. At other flight conditions, the vanes 32 may be set to cause less flow into the ducts 24 or no flow. However, it would likely be desirable to have a certain amount of secondary air for most all operating modes. Also the vanes 56 and 58 would be positioned to have maximum ambient air flow for noise suppression.

As indicated earlier herein, certain advantages can be obtained by having the mixed engine (i.e., the mixture of engine exhaust and secondary air) be supersonic, so as to recognize certain operating advantages.

It is believed that the operation of the other embodiments shown herein are evident from the above noted description, so again, there will not be at this time be presented a detailed description of these.

What is claimed is:

1. A noise suppressing nozzle for a gas turbine engine, comprising:
    a. a tail fairing;
    b. an annular wall surrounding said tail fairing, said annular wall having a downstream end forming an outlet for said nozzle;
    c. an annular space defined by and radially between said tail fairing and said annular wall;
    d. a plurality of air inlets in said annular wall, spaced apart circumferentially about said nozzle;
    e. a plurality of air ducts, one for each air inlet, each said air duct including a fixed forward portion having a radial outward end connected to said annular wall and leading inwardly from its air inlet into said annular space, said air ducts having an axial outlet end within said annular space, upstream of the nozzle outlet;
    f. axial hot gas passages defined by and circumferentially between said air ducts;
    g. said annular space having an upstream portion which in use receives turbine exhaust gases, and an elongated downstream portion downstream of the air ducts and the hot gas passages, wherein hot gases flowing rearwardly through said hot gas passages induce air flow in through said air ducts, and said hot gases and the induced air mix within the elongated downstream portion of said annular space, upstream of the nozzle outlet;
    h. each said hot gas passage being defined by and between a pair of side wall surfaces, said sidewall surfaces being configured to give the hot gas passages a convergent/divergent shape in the axial direction.

2. A noise suppressing nozzle for gas turbine engine, comprising;
    a. a tail fairing;
    b. an annular wall surrounding said tail fairing, said annular wall having a downstream end forming an outlet for said nozzle;
    c. an annular space defined by and radially between said tail fairing and sail annular wall;
    d. a plurality of air inlets in said annular wall, spaced apart circumferentially about said nozzle;
    e. a plurality of air ducts, one for each air inlet, each said air duct including a fixed forward portion having a radial outward end connected to said annular wall and leading inwardly from its air inlet into said annular space, upstream of the nozzle outlet;
    f. axial hot gas passages defined by and circumferentially between said air ducts;
    g. said annular space having an upstream portion which in use receives turbine exhaust gases, and an elongated downstream portion downstream of the air ducts and the hot gas passages, wherein hot gases flowing rearwardly through said hot gas passages induce air flow in through said air ducts, and said hot gases and the induced air mix within the elongated downstream portion of said annular space, upstream of the nozzle outlet;
    h. each air duct having a substantially U-shape cross-section, a closed upstream end, and a pair of sidewalls, the outlet ends of the air ducts being defined between the sidewalls at the rear ends of the air ducts.

3. A noise suppressing nozzle according to claim 2, wherein said sidewalls have movable rear portions, each said rear portion including a forward end and means mounting said rear portion for sideways pivotal movement about a pivot axis which is located within an axial plane adjacent said forward end.

4. A noise suppressing nozzle according to claim 3, wherein each said pivot axis extends substantially radially within said axial plane.

5. A noise suppressing nozzle according to claim 4, wherein the movable rear portions of said sidewalls have rear ends which slope rearwardly as they extend radially outwardly from the tail fairing to the annular wall.

6. A noise suppressing nozzle according to claim 3, wherein said nozzle includes a longitudinal center axis and each said pivot axis extends both radially outwardly and axially forwardly from said tail fairing, within an axial plane.

7. A noise suppressing nozzle according to claim 6, wherein said rear portions of the sidewalls have rear ends which are disposed in a transverse radial plane.

8. A noise suppressing nozzle according to claim 2, wherein said air ducts and said hot gas passages are wider adjacent said annular wall than they are adjacent said tail fairing.

9. A noise suppressing nozzle according to claim 2, wherein said sidewalls have fixed forward portions and movable rear portions, each said rear portion including a forward end and a rearward end, and pivotal connections adjacent said forward ends, mounting said rear portions for sideways pivotal movement between a first position in which said rear portions are in substantial alignment with said forward portions, and a second position in which the rear ends of adjacent rear portions substantially meet to close the air ducts.

10. A noise suppressing nozzle according to claim 9, wherein the air ducts are wider than the hot gas passages when said rear portions are in their first position.

11. A noise suppressing nozzle according to claim 10, wherein said rear portions are configured to give the hot gas passages a convergent/divergent shape in the axial direction.

12. A noise suppressing nozzle for a gas turbine engine, comprising:
   a tail fairing;
   an annular wall surrounding said tail fairing, said annular wall having a downstream end forming a outlet for said nozzle;
   an annular space defined by and radially between said tail fairing and said annular wall;
   a plurality of air inlets in said annular wall, spaced apart circumferentially about said nozzle;
   a plurality of air ducts, one for each air inlet, each said air duct leading inwardly from its air inlet into said annular space, each said air duct having an axial outlet end within said annular space, upstream of the nozzle outlet;
   axial hot gas passages defined by and circumferentially between said air ducts;
   said air ducts including fixed forward portions having radial outer ends which are connected to the annular wall, and a radial inner end;
   a plurality of axially elongated hub ring segments, one for each air duct forward portion, each said hub ring segment being connected to the radial inner end of its air duct forward portion; and
   said hub ring segments together defining a substantially tubular hub, with the hub ring segments separated by axially extending splits.

13. A noise suppressing nozzle according to claim 12, wherein each air duct forward portion includes a closed forward wall and a pair of fixed sidewall portions, and wherein each air duct also includes a pair of movable rear sidewall portions, each extending rearwardly from a separate one of the fixed forward sidewall portions, each said movable rear sidewall portion being mounted for pivotal sideways movement and at its radially inner end being pivotally connected to a said hub ring segment.

14. A noise suppressing nozzle according to claim 13, comprising a live axle at the outer end of each movable rear sidewall portion, and a drive mechanism being operable for rotating the movable rear side portions of the air ducts together and apart, for controlling the size of the outlet ends of the air ducts.

15. A noise suppressing nozzle according to claim 12, comprising seal means for sealing forward end portions of the axially extending splits.

16. A noise suppressing nozzle according to claim 15, wherein said seal means comprises a separate seal member for each axial split, each said seal member including an inner portion inside the hub ring extending axially along the split, and outer portion outside of the hub ring extending axially along the split and a forward portion forwardly of the split, interconnecting the inner and outer portions.

17. A noise suppressing nozzle according to claim 13, comprising a flange at the radial outer end of each movable rear side portion of the air ducts, and an axially extending seal member, extending radially inwardly from the annular wall and contacting said flange.

18. A noise suppressing nozzle according to claim 17, comprising a seal member cavity in the annular wall for each said seal member, with each said seal member being disposed in said cavity.

* * * * *